Oct. 29, 1963    J. M. MILLER ETAL    3,108,318
MACHINE FOR STUFFING SAUSAGE AND SIMILAR CASINGS
Filed March 11, 1960    10 Sheets-Sheet 2

INVENTOR.
Jack M. Miller, Marshall Long,
Charles F. Rapp, and Lewis F. Alley
BY
Paul E. Mullendore
ATTORNEY

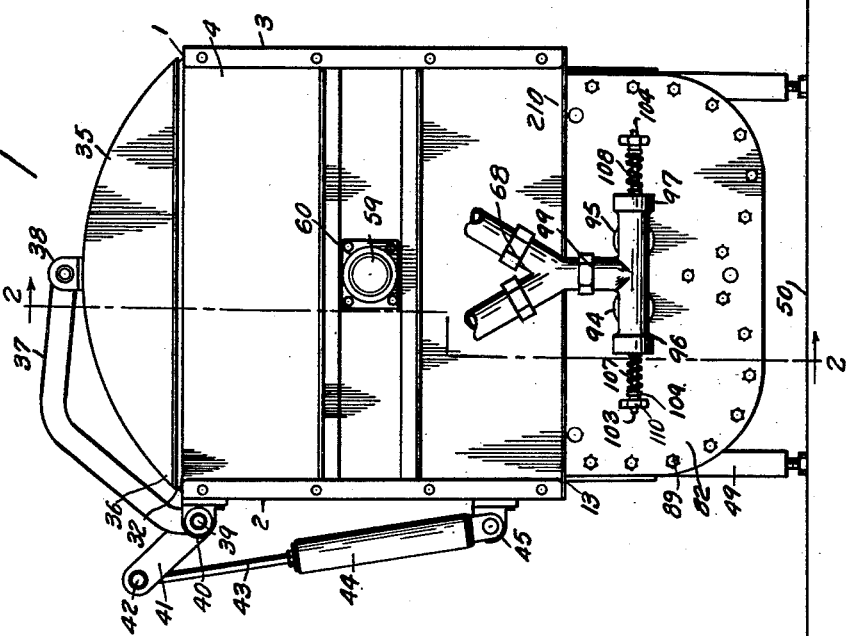
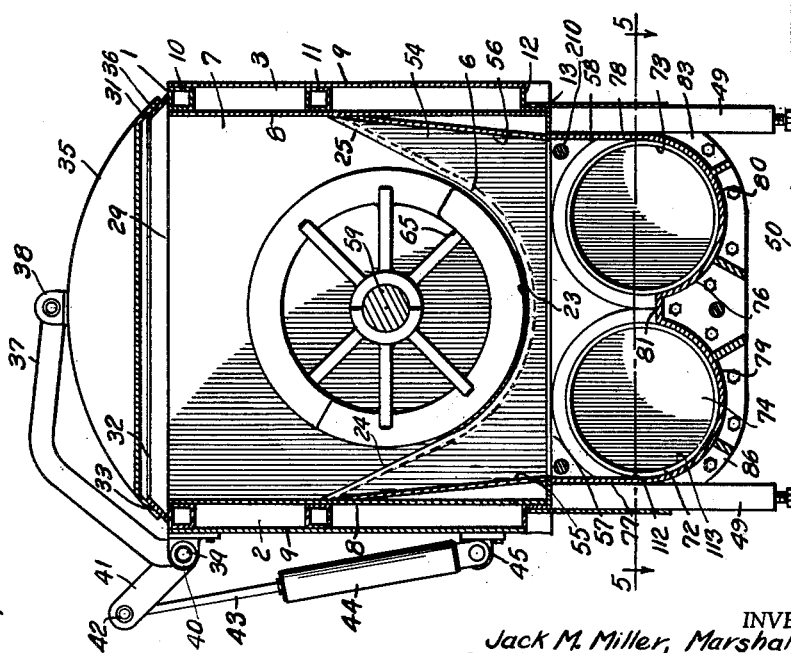

INVENTOR.
Jack M. Miller, Marshall Long,
Charles F. Rapp, and Lewis F. Alley
BY
Paul E. Mullendore
ATTORNEY

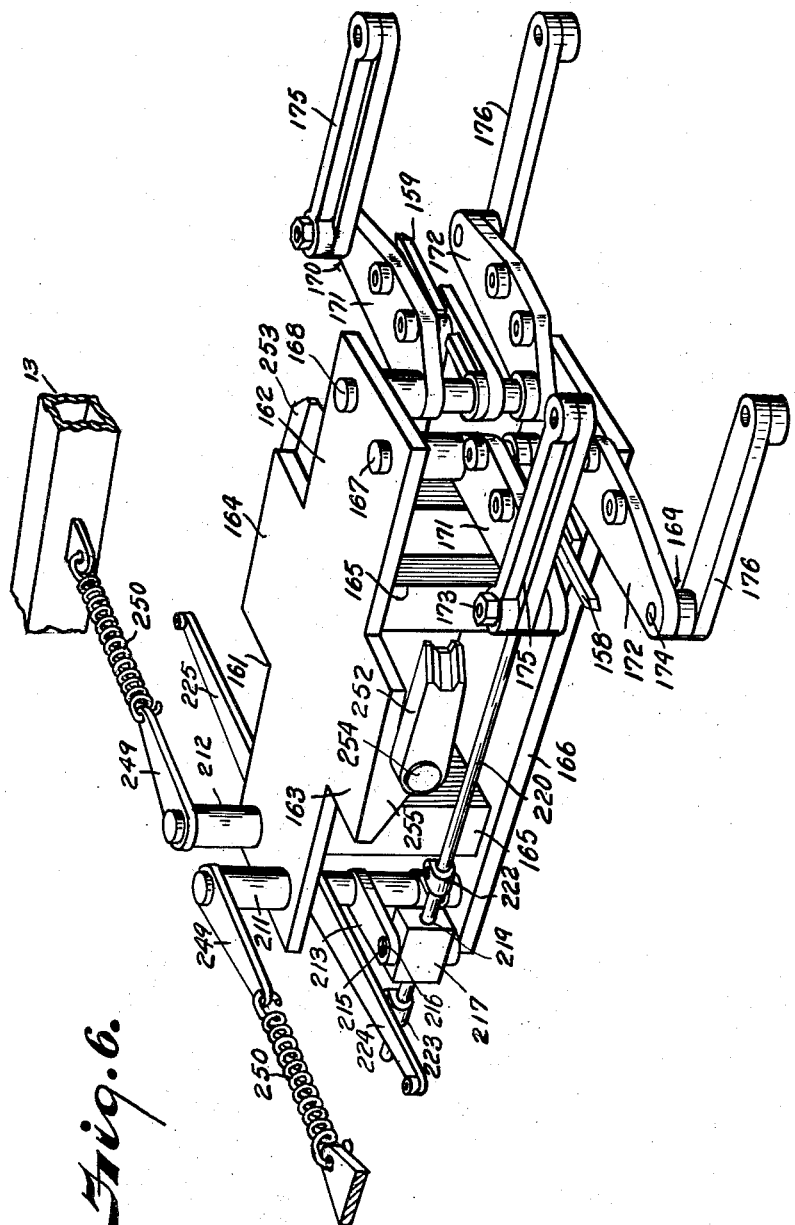

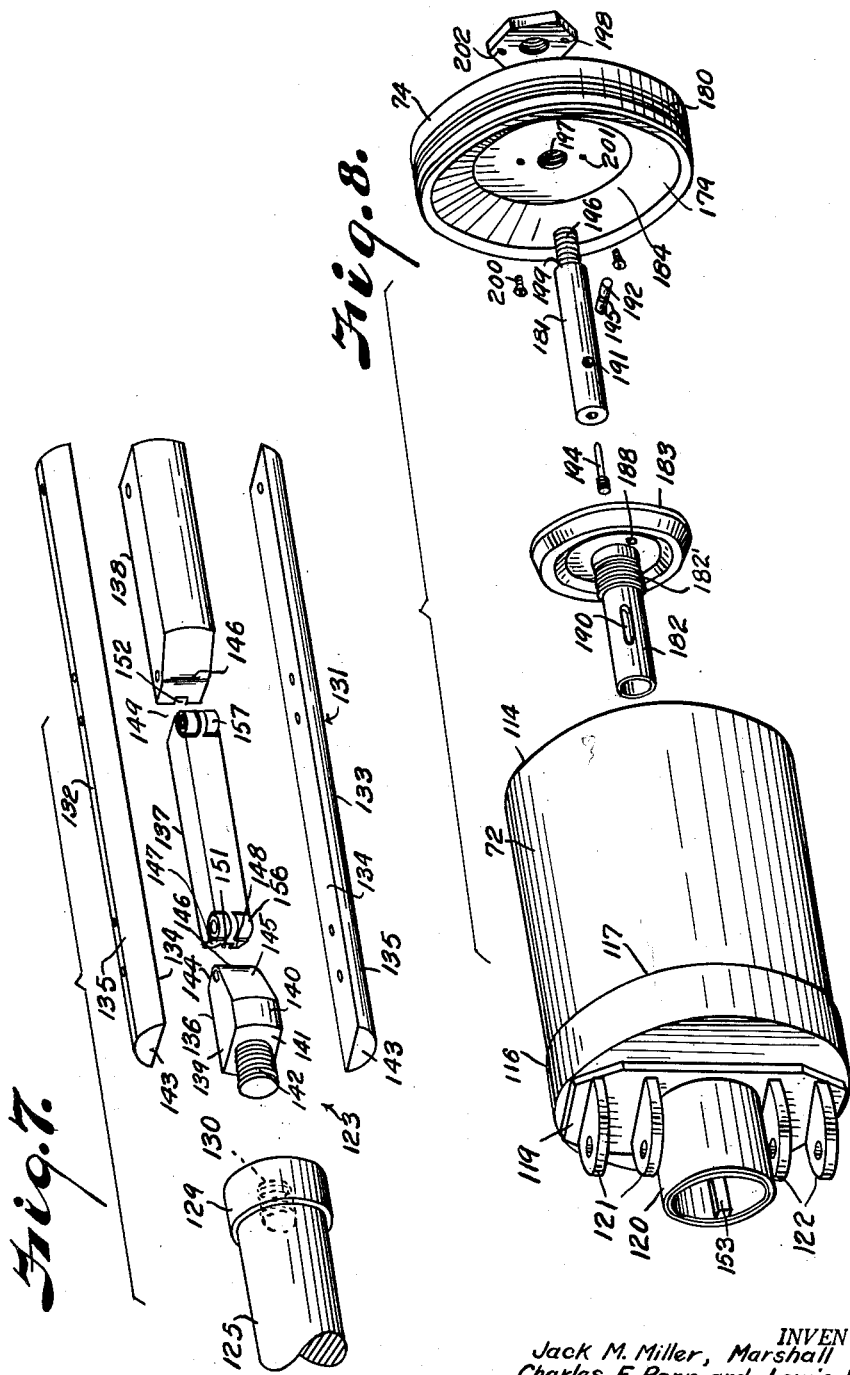

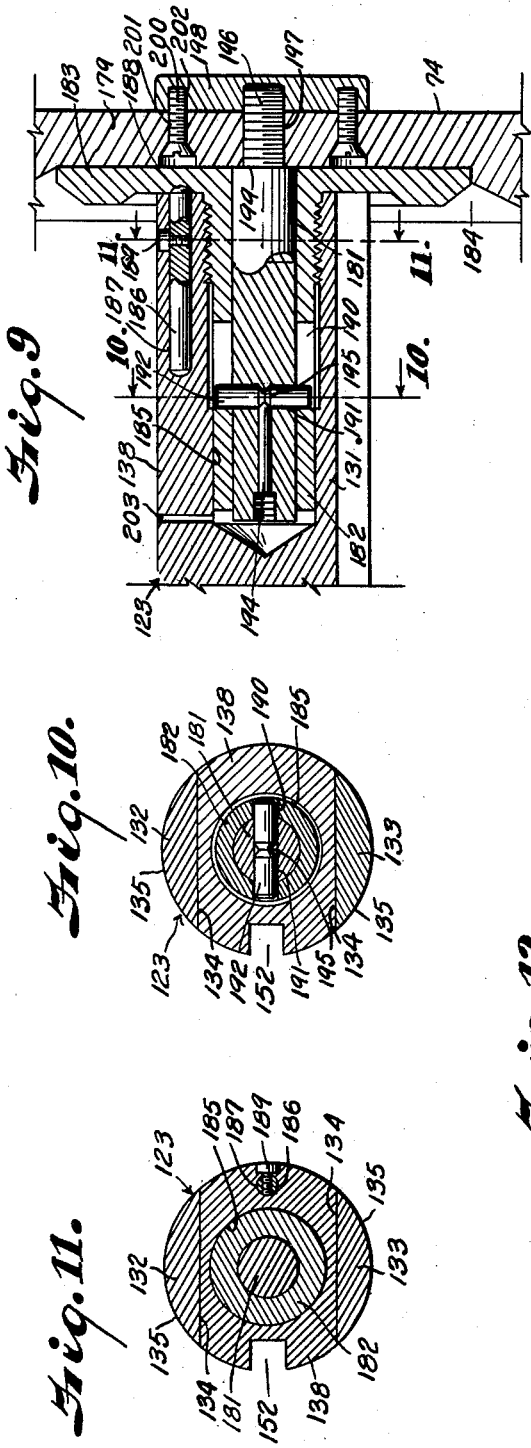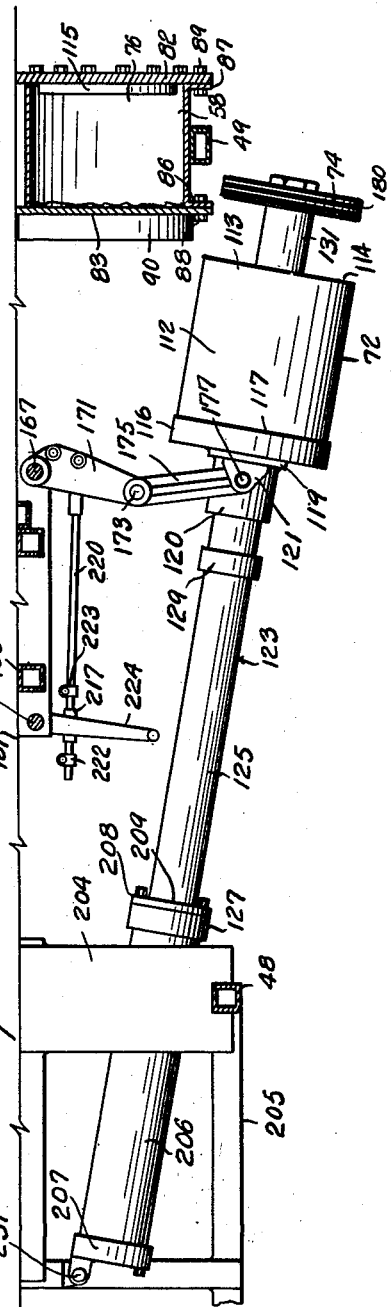

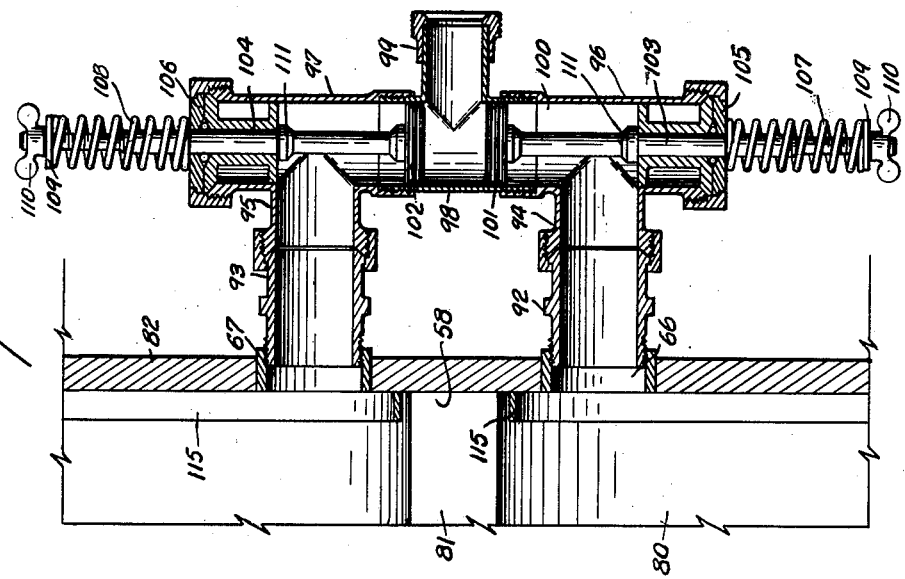
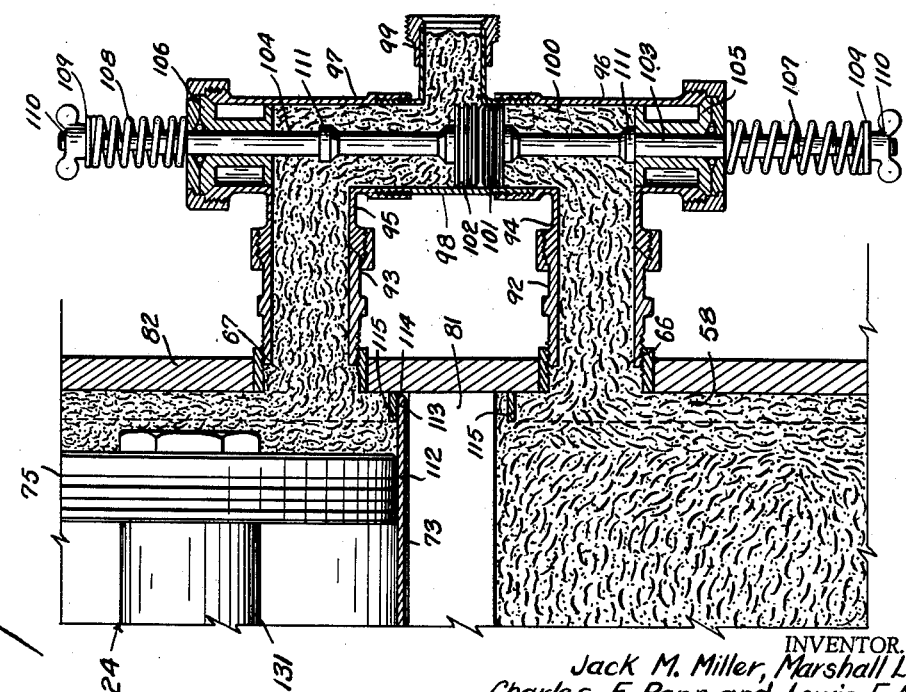

INVENTOR.
Jack M. Miller, Marshall Long,
Charles F. Rapp, and Lewis F. Alley
BY
Paul E. Mullendore
ATTORNEY INVENTOR.
Jack M. Miller, Marshall Long,
Charles F. Rapp and Lewis F. Alley
BY
Paul E. Mullendore
ATTORNEY United States Patent Office 3,108,318
Patented Oct. 29, 1963

3,108,318
MACHINE FOR STUFFING SAUSAGE AND
SIMILAR CASINGS
Jack M. Miller, Kansas City, and Marshall Long, Overland Park, Kans., and Charles F. Rapp and Lewis F. Alley, Kansas City, Mo., assignors to Marlen Equipment Company, Overland Park, Kans., a corporation of Missouri
Filed Mar. 11, 1960, Ser. No. 14,374
24 Claims. (Cl. 17—39)

This invention relates to a machine for stuffing sausage and similar casings, and has for its principal object to provide a machine of this character wherein the stuffing operation is continuous from a supply of sausage material that is replenished from time to time without interfering with the continuity of the stuffing operation.

In carrying out this feature of the invention, the sausage material is thoroughly mixed and fed in substantially continuous flow to a discharge chamber in which a pair of piston and cylinder assemblies alternately discharge the material under stuffing pressure.

Other objects of the invention are to provide for adjusting the stuffing pressure to a desired amount best suitable for the nature of the material and character of the casings that are stuffed therewith; to utilize suction effected by retraction of the piston and cylinder assemblies to facilitate movement of the sausage material into the discharge chamber; to effect filling of the cylinders on projecting the cylinders through the material in the discharge chamber; to eject the sausage material under pressure of the pistons; and to provide an initial retractive movement of the cylinders ahead of the retractive movement of the pistons, thereby avoiding an initial suction pressure tending to retard retractive movement of the cylinders.

Other objects of the invention are to provide for automatic operation of the piston and cylinder assemblies in alternate timed relation with each other; to provide a fluid pressure activated power mechanism for actuating the piston and cylinder assemblies; to provide for activating the power cylinders utilizing high and low pressure fluids; to provide valve mechanisms for controlling admission and exhaust of the high and low pressure fluids; to provide electrical timing means operable responsive to movement of the cylinders for timed actuation of the valve mechanisms; and to provide the machine with simple and efficient mixing and feeding mechanisms.

Other objects of the invention are to provide a machine which is of relatively simple construction, easily cleaned and kept in sanitary condition, and which is well adapted for manufacture from the more expensive stainless metals.

Further objects of the invention are to adapt the machine for hydraulic operation of the piston and cylinder assemblies, so as to eliminate operating hazards and air exhaust noise; to provide a machine comprising a self-contained unit requiring only water and electrical connections; to provide a relatively small, compact machine that is conservative of floor space; and to provide a stuffing machine which results in a more dense and satisfactory product, free of air pockets.

In accomplishing these and other objects of the invention, we have provided improved structure, the preferred form of which is illustrated in the accompanying drawings, wherein:

FIG. 3 is a cross section through the machine on the line 3—3 of FIG. 2.

FIG. 4 is a view of the discharge end of the machine, showing the exterior of the material control valve and connection with the inlet of the manifold that conducts the sausage material to the stuffing nozzles.

FIG. 6 is an enlarged perspective view of the cylinder operating mechanism and the trip mechanism actuated thereby for operating the control switches.

FIG. 7 is a perspective view of the parts of one of the piston rods, shown in disassembled, spaced relation.

FIG. 8 is a perspective view of one of the cylinders and the parts of the related piston, shown in disassembled, spaced relation.

FIG. 9 is an enlarged section through a portion of one the pistons, showing connection of the piston rod therewith.

FIG. 10 is a cross section on the line 10—10 of FIG. 9.

FIG. 11 is a similar section on the line 11—11 of FIG. 9.

FIG. 12 is a detail plan view, partly in section, showing one of the piston and cylinder assemblies moved out of the discharge compartment of the machine to facilitate cleaning thereof.

FIG. 13 is an enlarged horizontal section through a portion of the discharge compartment, showing the valving mechanism for controlling discharge of sausage material from one and the other of the cylinders, the section being taken on the line 13—13 of FIG. 2.

FIG. 14 is a similar section showing the valving elements in position for closing flow of sausage material to the manifold connection.

Figure 1:
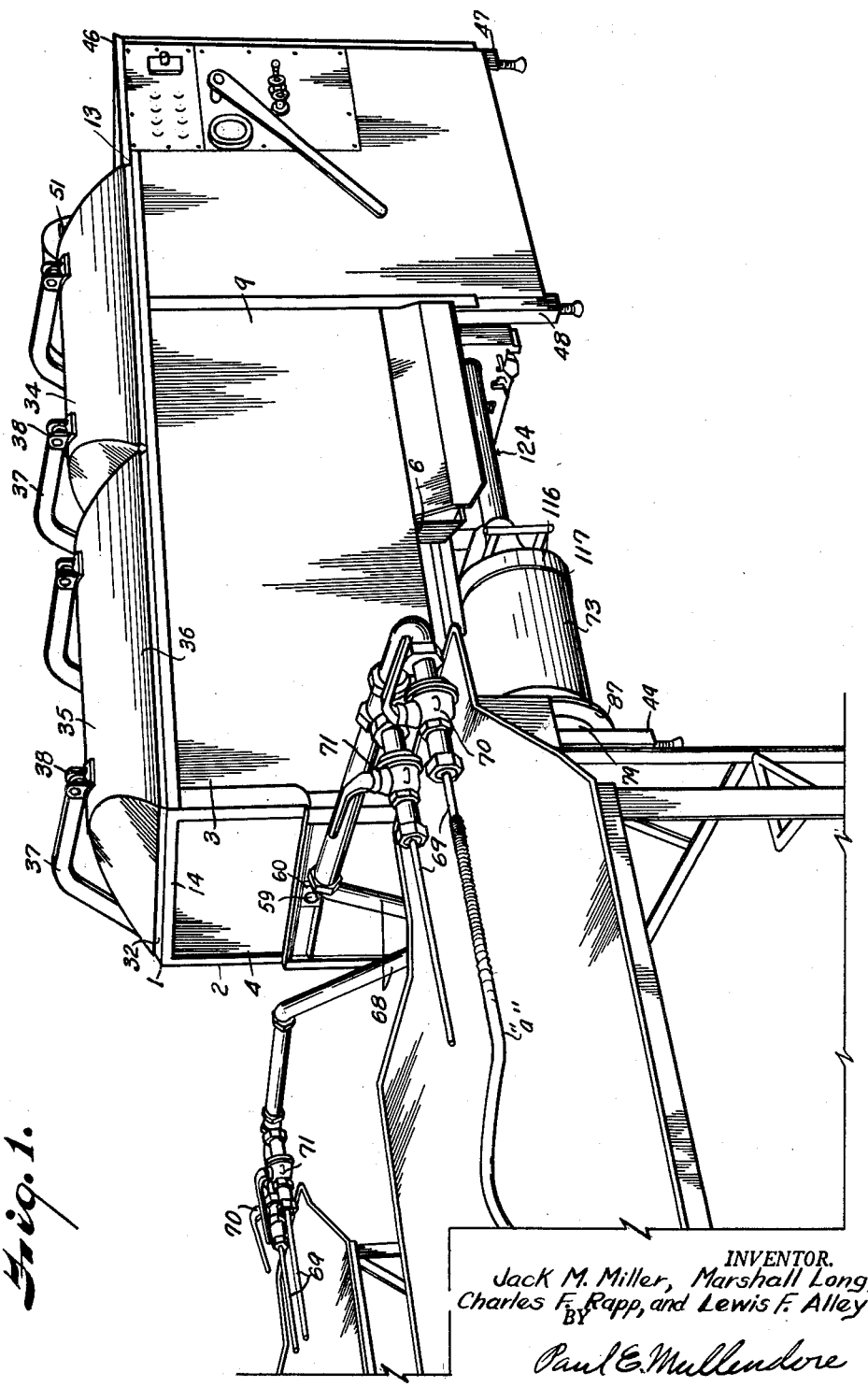
FIG. 1 is a perspective view of a sausage stuffing machine constructed in accordance with the present invention.
Figure 2:
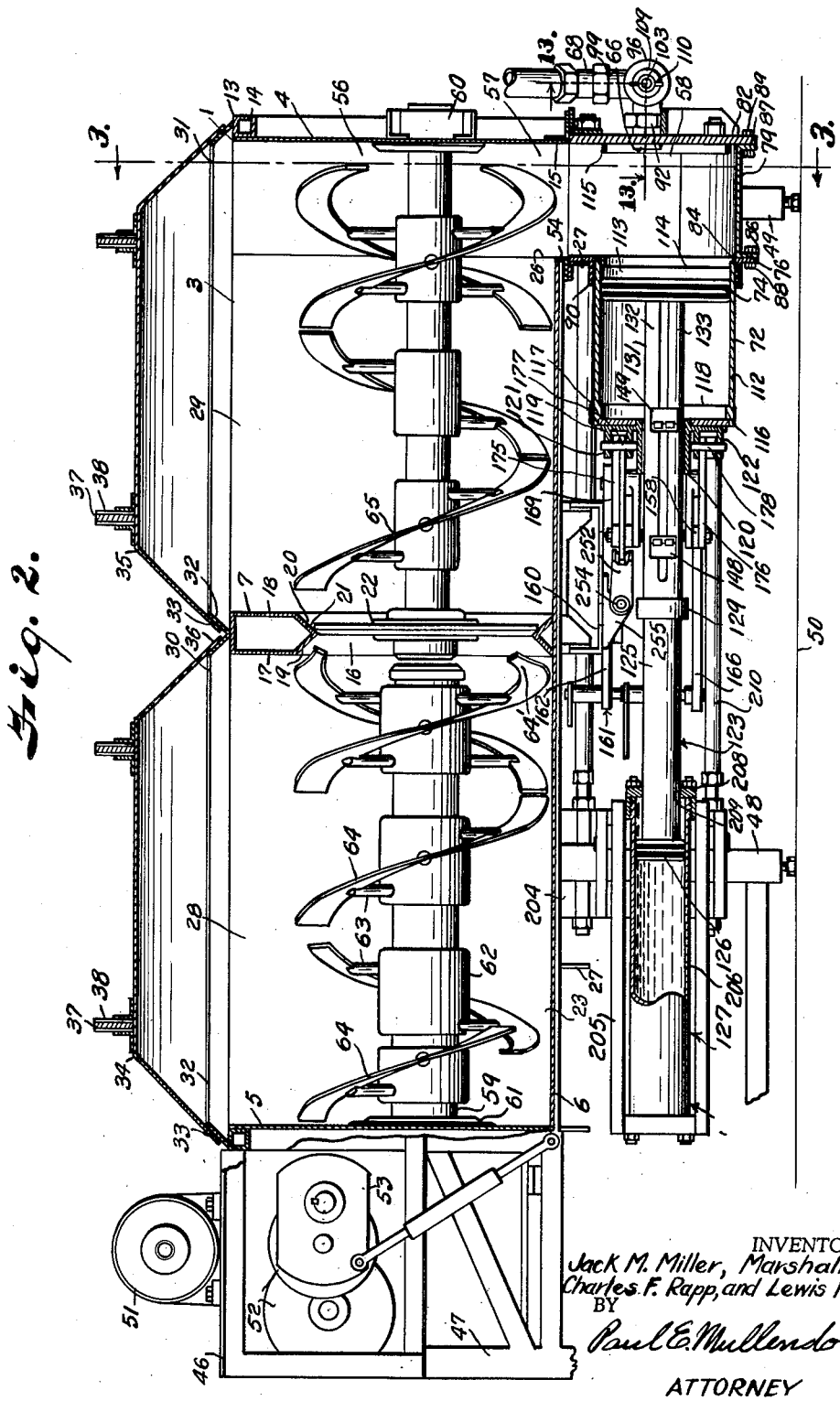
FIG. 2 is a longitudinal vertical sectional view through the machine taken on the line 2—2 of FIG. 4, with the feeding elements, pistons and piston rods being shown in elevation and with parts being broken away.

Referring more in detail to the drawings:

The machine illustrated includes an elongated, generally rectangular casing 1, having side walls 2—3, end walls 4—5, a bottom 6, and a transverse inner partition 7. The side walls of the casing are preferably of hollow construction in that they include inner and outer sheets 8 and 9 attached to the inner and outer sides of longitudinal members 10, 11 and 12 of a frame 13. The members 10 and 12 extend along the top and bottom of the walls and the member 11 extends along the sides at the connections of the edges of the bottom 6. The end walls 4 and 5 may comprise single plates suitably connected with the inner sheets 8 of the side walls and with upper and lower transverse members 14 and 15 of the frame. Where strength is required of stainless metals, for example, around the top, corners and other parts of the casing, the frame members may be of tubular construction, as illustrated. In other places the frame members, such as the lower longitudinal members 12 and transverse members 15, may be angles, as shown in FIGS. 1 and 2.

The transverse partition 7 has a circular opening 16 therein and includes spaced apart metal plates 17 and 18 connected with the sides and bottom of the casing and which are shaped and connected together about the periphery of the opening 16, to provide converging flange portions 19 and 20 forming an annular valve seat 21 for a valve element 22, later to be described.

The bottom 6 of the casing is of trough-like shape, in that it has a partially cylindrical portion 23 extending longitudinally of the casing and upwardly diverging side portions 24 and 25 that are connected with the inner sheets of the side walls adjacent the longitudinal frame members 11, as shown in FIG. 3. One end of the bottom is connected with the plate of the end wall 5, but the other end terminates short of the opposite end wall 4 to provide a bottom opening 26 at that end of the casing. The partition 7 is shaped to correspond with the bottom 6 and is connected therewith to provide tight joints. The bottom 6 is supported transversely on the underside thereof by transverse plate members 27 that are spaced along the length thereof.

The construction of the casing and frame parts is important, since the necessary strength in a lightweight structure is provided and permits practical use of stainless, noncorrosive metals that are easily kept clean and sanitary.

The partition 7 cooperates with the end, side walls, and the bottom to form compartments 28 and 29 that are connected together by the opening 16, whereby the sausage materials may be initially mixed and worked to produce a plastic mass of uniform composition in the compartment 28 and transferred through the valved opening 16 into the compartment 29, where the working of the material is continued to produce a mixture free of voids and to work the material through the discharge opening 26.

The compartments 28 and 29 have top openings 30 and 31 surrounded by upwardly and inwardly inclined flanges 32 that are suitably secured to the upper members of the frame for providing seats 33 for covers or lids 34 and 35. The covers 34 and 35 are preferably of dome shape and have outwardly and downwardly sloping marginal portions 36 telescoping over the flanges 32. The covers 34 and 35 are preferably carried by pairs of arms 37 having ends pivotally connected between ears 38 on the covers. The opposite ends of the arms 37 are attached to shafts 39 that extend longitudinally of the side wall 2 at the upper portion thereof, the shafts being oscillatable in brackets 40 that are attached to the wall of the casing. The shafts 39 have crank arms 41 which are pivotally connected as at 42 with piston rods 43 that are slidable in cylinders 44. The cylinders 44 are anchored to ears 45 on the lower portions of the side wall 2, as shown in FIG. 3. With admission and discharge of a suitable pressure medium to and from the respective ends of the cylinder, the covers 34 and 35 may be moved into and out of closing position with respect to the open tops of the compartments.

Connected with the outer side of the end wall 5 is a frame 46 having legs 47 that cooperate with pairs of legs 48 and 49 of the casing frame 13 to support the casing 1 above the floor indicated by the line 50.

The frame 46 constitutes a support for a motor 51, pumps 52 for supplying high and low pressure fluids used in the operation of the machine, and a speed reduction mechanism 53 that is suitably connected with a sausage mixing and feeding mechanism contained within the compartments 28 and 29. The frame 46 may also carry various hydraulic and electrical controls and pressure gauges that are required in the operation of the machine.

The end of the bottom 6 that terminates in spaced relation with the end wall 4 is connected with a transverse plate 54 to close the space below the cylindrical and diverging ide wall portions of the bottom 6. The plate 54 and end wall 4 are connected at the sides by downwardly and inwardly sloping plates 55 and 56 (FIG. 3) to provide a throat 57 leading into a depending compartment 58 into which the sausage material is substantially continuously discharged in a solid plastic mass, as later described.

The sausage mixing and feeding mechanisms may comprise a shaft 59 extending longitudinally of the compartments 28 and 29 and axially through the opening 16 of the transverse partition, with the ends being journaled in bearings 60 and 61 that are carried by the end walls 4 and 5 of the casing. Adjustably fixed to the shaft 59 within the compartment 28 are collars 62 having radially extending arms 63 carrying spiral blade segments 64 which are suitably designed to mix the sausage material in the compartment 28 and feed the mixed material through the discharge opening 16 into the compartment 29 when the valve 22 is unseated under pressure of the feed of material. The valve 22 is of a size to close the opening and is slidable upon the shaft under spring pressure. As shown in the drawing (FIG. 2), the terminals 64' of the endmost blades are suitably shaped to facilitate directional feed of the material through the opening 16 into the compartment 29, where it is engaged by similar mixing and feeding elements 65 that are also fixed to the shaft 59, and which continue the mixing and feeding of the sausage material to the discharge opening 26. The endmost elements in the respective compartments are arranged to form the segments of double spirals, to facilitate passage of the sausage material through the opening 16 and throat 57, respectively.

With the apparatus thus far described, the sausage material is packed into the compartment 58 by the spiral blade segments 65, but the feed is supplemented by a suction force, as later described, to assure that the sausage material is free of voids that might contain entrapped air.

Another feature is that the suction established on the sausage material within the discharge compartment prevents leakage of any of the sausage material under the pressures that are necessary to fill the compartment 58.

The sausage material is to be forceably discharged alternately through ports 66 and 67 (FIGS. 13 and 14) to a manifold 68 supplying one or more pairs of nozzles 69 through which the sausage is injected into casings "a" that are gathered upon the nozzles. As one casing fills, it automatically withdraws from its nozzle, and just before filling of the casing is completed, the nozzle is shut off by a valve 70, while a valve 71, connected with the other nozzle of the pair, is opened to effect fill of another casing that has been applied during filling of the first casing. The nozzle arrangement and filling of the casings follow the method in present batch machines, however, in batch machines the entire stuffing operation must be suspended while another batch of material is being placed under pressure to continue the feed of the sausage material to the nozzles.

As above stated, it is a principal object of the present invention to maintain a continuous supply of sausage to the manifolds that supply the nozzles, so that the stuffing operation is continuous. In carrying out this part of the invention, portions of sausage material in the discharge compartment are entrapped within one and another of alternately operating cutters or cylinders 72 and 73 that are alternately projected into the discharge compartment to cut through the sausage therein (much in the same manner as a biscuit cutter cuts biscuits from a sheet of dough to leave a portion of the dough within the cutter).

In operation, one of the cutters or cylinders is pushed through the sausage material until the open end of the cylinder makes contact with the opposite wall of the discharge compartment, where the open end of the cylinder forms a seal about one of the outlet ports, for example, the port 66. Pressure is then applied to the material by a piston 74 contained in the opposite end of the cylinder and movable therethrough to eject the sausage material. During this movement, the other cylinder and its piston 75 are being withdrawn easily from the port 67 at differential speeds and in such sequence that a suction is drawn upon the sausage material in the throat 57. Therefore, a solid charge of sausage material is drawn into the space previously occupied by the retreating cylinder and its piston. It is thus obvious that by continuing alternate operations of the cutters or cylinders and their pistons, the discharge of the sausage material is continuous, and that pressure applied is confined within one cylinder, while a vacuum is established in the other, to assure a complete charge of the sausage material. It is also apparent that the high and vacuum pressures do not interfere with each other, because the pressure when established is contained within the cylinder that is ejecting the sausage material.

The compartment 58 is formed by a bottom member 76 having side wall portions 77 and 78 that connect with sides of the throat 57 and which curve inwardly to provide arcuate bottom portions 79 and 80 conforming in radius with the outer radii of the cutters or cylinders 72 and 73 and are joined at the center by a web portion 81. The end of the compartment in plane with the end wall 4 of the casing is closed by a substantially strong and rigidly reinforced plate 82 capable of withstanding the ejecting pressures of the pistons. The opposite end of the compartment 58 is closed by a plate 83 having openings 84 and 85 corresponding in radius with the radius of the cylinders and bottoms 79 and 80. The plates 82 and 83 are connected to flanges 86 and 87 on opposite sides of the member 76 by fastening devices such as bolts 89. Extending from the outer side of the plate 83 are collars 90 and 91 having internal sealing grooves in contact with the cylinders.

The outlet ports 66 and 67 are formed in the plate 82, and since they both connect with the manifold, a check valve mechanism is provided to stop back pressure through one port when sausage material is ejected under pressure through the other port, as now to be described. Each port connects through fittings 92 and 93 with branches 94 and 95 of T fittings 96 and 97 which are interconnected by a reversely arranged T fitting 98 having a branch 99 providing a connection with the manifold 68 (see FIGS. 13 and 14). The fittings 96—97—98 thus provide a through passageway 100 interconnecting the outlet ports 66 and 67 with the manifold 68. Slidably mounted within the passageway are piston-like valving elements 101 and 102 having stems 103 and 104 that slide through pressuretight bearing elements 105 and 106 that close outer ends of the passageway. When pressures are equalized on the valving elements 101 and 102, the valving elements repose on opposite sides of the connection 99, thereby closing the manifold with respect to both outlet ports 66 and 67. This positioning of the valving elements is brought about by springs 107 and 108 that are sleeved over projecting ends of the valve stems and which have one end bearing against the pressure seals of the bearing elements and their opposite ends against washers 109 that are backed by adjusting nuts 110, whereby the action in the springs 107 and 108 can be adjusted to hold the valving elements in closing position. In closing position of the valving elements 101 and 102, stop collars 111 on the stems 103 and 104 engage the inner ends of the bearing elements 105 and 106 (see FIG. 14). When pressure is established, for example, by the piston 75, to eject the sausage material through the outlet port 67, the sausage material presses on the outer face of the valving element 102 to shift the valving element 102 across the connection 99 and into abutment with the valving element 101, to open up the manifold to the sausage material and to close the passage to the outlet port 66. When the cycle is reversed and pressure is supplied to the sausage material by the piston 74, the pressure of the sausage material on the valving element 101 effects shift of both valving elements 101 and 102 to the opposite side of the connection 99, thereby providing communication between the outlet port 66 and the connection 99 to continue movement of sausage material to the manifold. At this time, the other piston 75 is under retractive movement, thereby relieving the pressure through the outlet port 67 and starting the suction. The suction, however, is not effective on the sausage material in the manifold because the valving element 102 is closing the connection with the outlet port 67.

The cutters or cylinders 72 and 73 each include a relatively thin annular wall 112 having an open end 113 to provide a cutting edge 114. The cylinders are projectable through the sealing collars 90 and 91 of the plate 83 and into the compartment 58, so that the cutting edges 114 move through the sausage material in the compartment 58 and seats upon the inner face of the plate 82 in encircling contact with annular ribs 115 attached to the inner face side of the plate 82. It is thus obvious that seals are formed with the plate 82 to retain the sausage material from leaking back into the compartment 58. The opposite end of each cylinder 72 and 73 is closed by a head 116.

Figure 5:
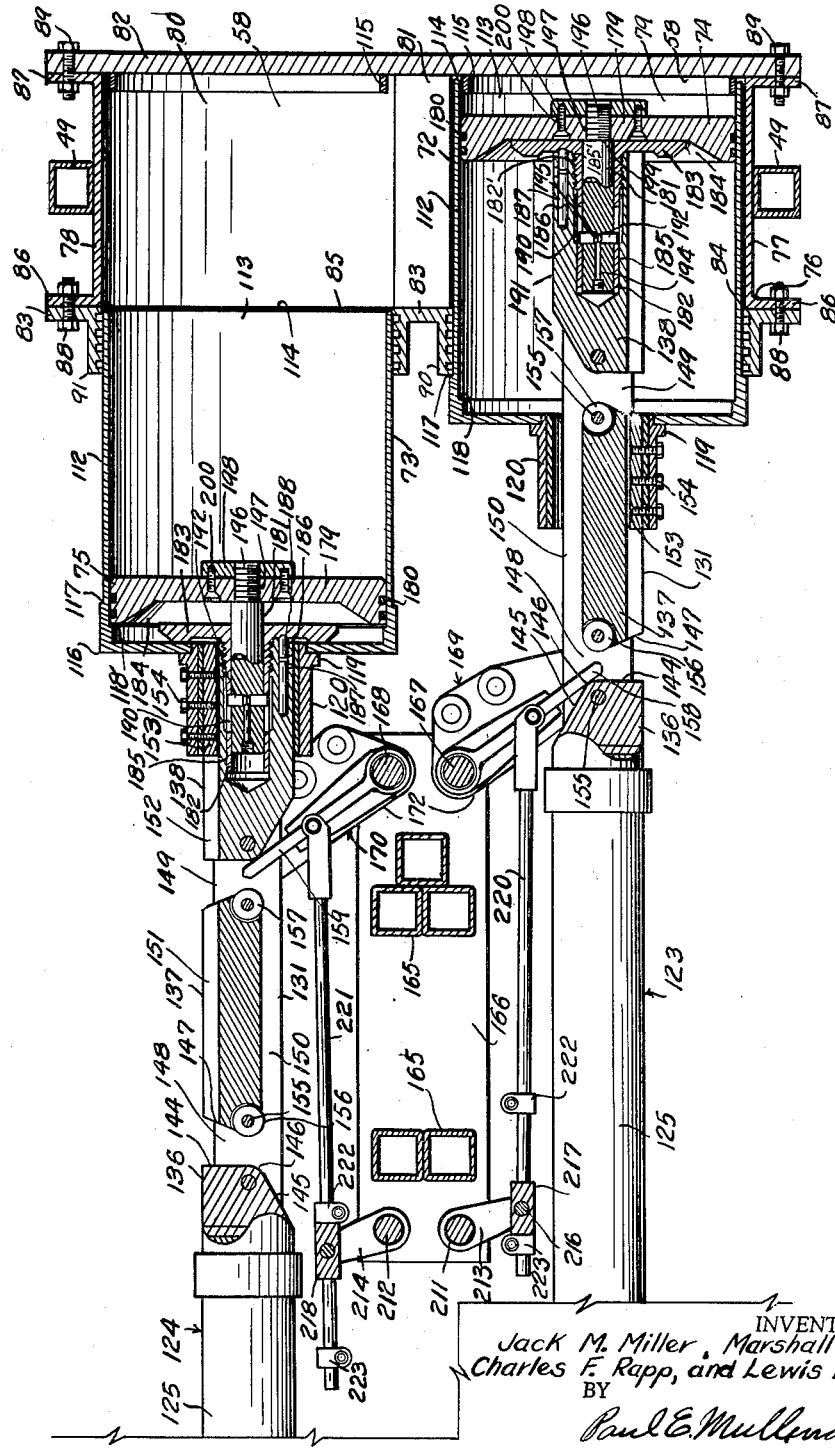
FIG. 5 is an enlarged horizontal section through the discharge end of the machine, taken on the line 5—5 of FIG. 3 and particularly illustrating the piston and cylinder assemblies and their connection with the piston rods that operate them, the cylinders being shown in elevation.

The head 116 of each cylinder 72 and 73 has an annular shoulder 117 on the outer circumference thereof to abut the collars 90 and 91, and the inner circumference has a shoulder 118 forming a stop for the pistons 74 and 75. Attached to the outer side of the head of each cylinder is a plate 119 carrying a bearing sleeve 120 and diametrically opposed pairs of ears 121 and 122. Slidably keyed in each bearing sleeve are the ends of piston rod assemblies 123 and 124. The piston rod assemblies are best illustrated in FIGS. 5 and 7, and each includes a rear rod section 125 that is connected with pistons 126 (FIG. 2) forming a part of power units 127 and 128, later to be described. The forward end of each rod section 125 carries a head 129 having an internally threaded socket 130 for attaching a composite forward rod section 131. Each rod section 131 is composed of spaced apart longitudinal members 132 and 133 having flat inner faces 134 and rounding outer faces 135 conforming to the circumference of the rod assembly (FIGS. 7, 10 and 11).

Interposed between the flat faces 134 of the longitudinal members 132 and 133 are blocks 136, 137 and 138 of special shape to complete the rod sections 131 (FIGS. 5 and 7). The block 136 has faces 139 corresponding to the faces 134 and arcuate sides 140 completing the contour of the rod. Projecting from a flat end portion 141 of the block is an externally threaded pin 142 adapted to be threaded into the internally threaded socket 130 to connect the rod sections. The flat end of the block 136 registers with ends 143 of the longitudinal members 132 and 133 to abut the end face of the rod section 125 (FIG. 7). The opposite end of the block 136 has a transverse face 144 and angularly extending side 145 joining with the transverse face in a rounding curve 146 to cooperate with an inclined end 147 of the block 137 to provide a transverse opening 148 through the rod section, for a purpose later described. The opposite end of the block 137 is similarly shaped to cooperate with an end of the forward block 138 in forming a similar transverse opening 149. One longitudinal side face of the block 137 is arcuate to conform with the cross section of the rod, but the opposite face is substantially flat and inset from the opposite side of the rod to provide a longitudinal groove or way 150 connecting the transverse openings 148 and 149. The forward block 138 has a cross section substantially conforming to the cross section of the block 136 to complete curvature of the rod section, so that the piston rod is adapted for reciprocating movement within the bearing sleeve. In order to retain the piston rod assembly in alignment with the cylinder, the outer faces of the blocks 137 and 138 have aligning grooves 151 and 152 for a key 153 that is fixed within the bearing sleeve of the cylinder by fastening devices such as cap screws 154, as shown in FIG. 5. The blocks 136, 137 and 138 are secured in their proper spaced relation between the longitudinal members by pins or the like 155. The pins for securing the block 137 also provide journals for guide rollers 156 and 157 at the respective ends of the block and which cooperate with the rounding portions 146 of the blocks 136 and 138 to guide arms 158 and 159 that connect the cylinders in operative relation with the piston rods, as now to be described.

Carried between the piston rod assemblies from a transverse member 160 (FIG. 2) which connects with members of the main frame is a lever supporting frame 161. The frame 161 includes an upper plate 162 having lateral portions 163 and 164 substantially midway of the length thereof, as best shown in FIG. 6. Connected with the plate 162 by posts 165 is a lower plate 166 which conforms in general shape with the longitudinal portion of the upper plate. The forward end portions of the upper and lower plates provide support for the upper and lower ends of vertical shafts 167 and 168. The arms 158 and 159 previously referred to are fixed to substantially midportions of the vertical shafts 167 and 168 and extend laterally therefrom to slide along the passageways 150 and engage in the respective transverse openings 148 and 149 of the rod assemblies for oscillating the vertical shafts 167 and 168 upon reciprocatory movement of the piston rod assemblies, to reciprocate the cylinders in timed relation with the pistons by means of linkages 169 and 170. Each linkage includes upper and lower arms 171 and 172, also fixed to the shafts 167 and 168, and connected with the outer end of each arm by pins 173 and 174 are links 175 and 176, as best shown in FIG. 6. The outer ends of the links 175 and 176 in turn connect by means of wrist pins 177 and 178 with the upper and lower pairs of ears 121 and 122, previously referred to, and which are carried by the cylinder heads 116.

It is thus obvious that when ends of the arms 158 and 159 engage in the transverse openings 148 and 149 of the rod assemblies to rock the shafts 167 and 168, the arms 171 and 172 will swing about the axis of the shafts to impart reciprocatory movement of the cylinders 72 and 73 through the link connections 175 and 176, whereby the cylinders are projected and retracted into and from the discharge compartment 58.

The pistons 74 and 75 are of like construction, and each includes a disk shaped body 179 having a grooved periphery containing sealing rings 180 for sealing contact with the inner surfaces of the cylinders 72 and 73. The pistons 74 and 75 have lost motion connection with the piston rod assemblies, whereby the cylinders 72 and 73 have an initial retractive movement independent of the pistons for breaking the seal established about the ribs 115 before the pistons start a suction force within the cylinders. In this manner, the cylinders have substantially free retractive movement.

Each piston is mounted on a secondary rod 181 which reciprocates in a sleeve 182 forming a part of a piston backing plate 183 adapted to enter a recess 184 on the retractive side of the piston and is of ample diameter to support the piston when ejecting the sausage material into and through the discharge manifold. The sleeve 182 has external threads 182' adapted to engage internal threads 185' of a bore 185 extending inwardly of the forward end of the block 138. The sleeve thus connects the backing plate to the forward end of the shaft assembly. The backing plate is fixed from rotation by a pin 186 supported in a bore 187 and which has an end adapted to be projected into a recess 188 of the backing plate, as shown in FIGS. 5 and 9. The pin 186 is retained in the recess 188 by a set screw 189. The rod 181 has limited reciprocatory movement within the sleeve 182 by providing the sleeve with diametrically opposed longitudinal slots 190 that register with a transverse bore 191 in the rod 181 to pass a pin 192 having its ends extending into the longitudinal slots 190, as best shown in FIGS. 5 and 9. The pin 186 is retained in a fixed position with the ends projecting into the slots 190 by a locking pin 194 threaded into an axial bore that opens inwardly from the outer end face of the rod 181, and which as a forward end engaging in an annular groove 195 of the pin 192.

The pistons may be secured to the rod 181 in any suitable manner, but in the illustrated instance the rods have reduced externally threaded extensions 196 passing through axial openings 197 in the pistons and each carrying a nut 198 that is threaded thereon, to draw the pistons into contact with annular shoulders 199 that are provided by the reduced extensions on the respective rods. Each nut 198 is locked from rotation by fastening devices, such as screws 200, which pass through suitable openings 201 in the pistons and are turned into threaded sockets 202 which are provided in the nut 198, as will be apparent in FIGS. 8 and 9. To provide for free action of the rods 181 within the sleeves 182, the blocks 138 are each provided with a vent port 203.

Mounted between the legs 48 is a frame 204 carrying therein a secondary frame 205 which mounts the power units 127 and 128, previously referred to. Each power unit includes a cylinder 206 closed at its rear end by a head 207 and at its forward end by a removable head 208 which is screwed onto the end of the cylinder, so that the power piston 126 may be inserted therein, the head 208 having an opening 209 therethrough for passing the fixed sections of the piston rod assemblies. It is understood that the opening 209 is provided with a suitable packing to prevent leakage about the piston rod section 125.

Figure 17:
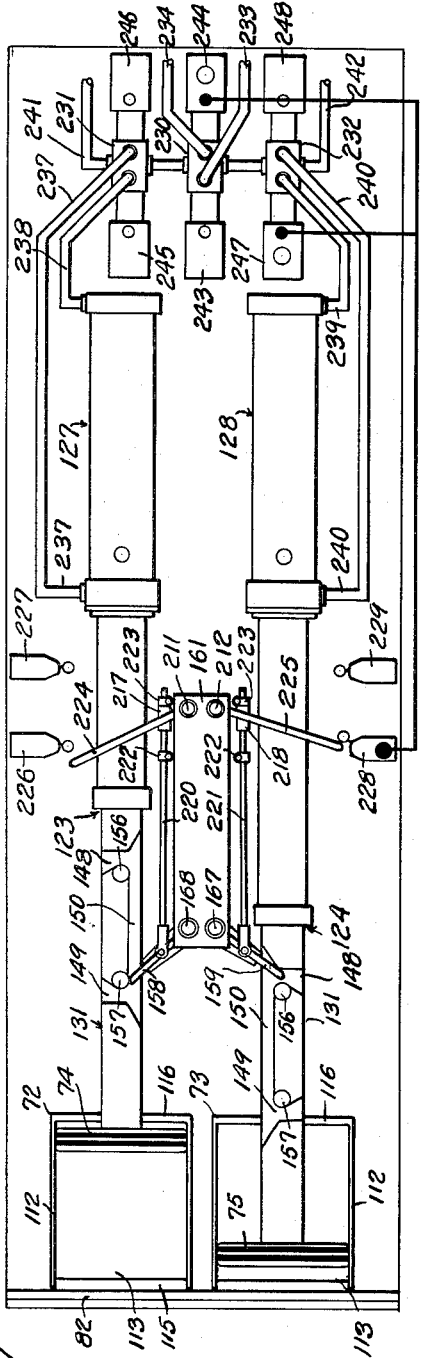
FIG. 17 is the reverse position of the pistons relatively to FIG. 15.
Figure 18:
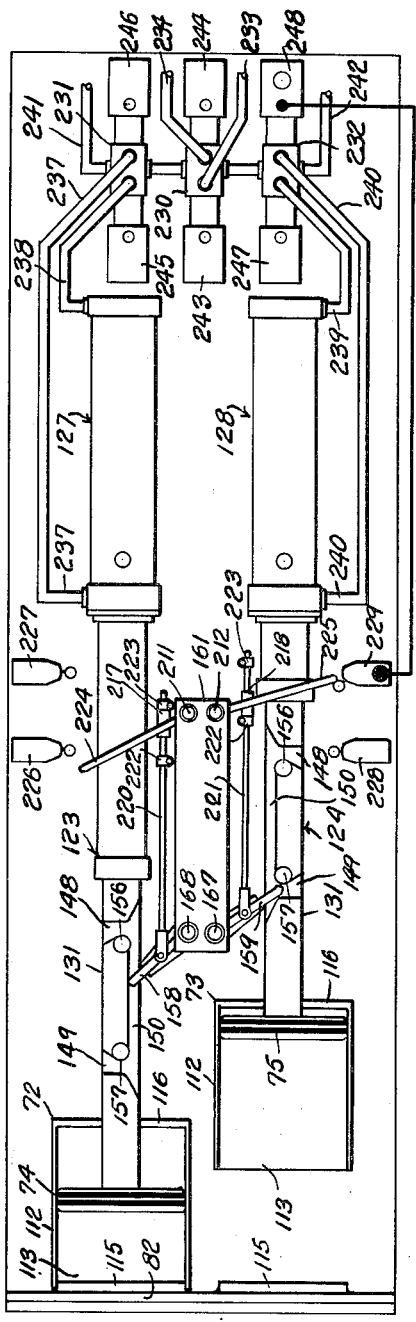
FIG. 18 is the reverse position of the pistons and cylinders relatively to FIG. 16.

In order to better withstand the longitudinal axial forces resulting from operation of the pistons 75 and 76, the frame carrying the power units is preferably connected with the plate 82 by tie rods 210. Actuation of the pistons of the power cylinders is controlled in proper timed relation, as now described. The rear end portions of the upper and lower plates 162 and 166 provide journals for the upper and lower ends of vertical shafts 211 and 212, and fixed thereon are pairs of arms 213 and 214. The outer ends of the pairs of arms have openings 215 therein journaling trunnions 216 on bearing blocks 217 and 218. The bearing blocks have longitudinal axial openings 219 (FIG. 6) for passing rods 220 and 221 which pivotally connect with the arms 158 and 159, respectively. When the arms 158 and 159 engage in the transverse openings 148 and 149 and are moved by the piston rod assemblies, the rods 220 and 221 move through the openings in the blocks 217 and 218 as restricted by stop collars 222 and 223. The collars 222 and 223 are adjustably clamped to the rods 220 and 221 on the respective sides of the blocks 217 and 218, so that when one or the other collars 222 and 223 make contact with the blocks 217 and 218, the shafts 211 and 212 are rocked to actuate lever arms 224 and 225 that are fixed to and project from the shafts 211 and 212, as best shown in FIG. 6. The lever arms 224 and 225 actuate electrical switches 226—227 and 228—229 that are fixed to parts of the frame at the respective sides of the machine (see the diagrammatic FIGS. 16 to 18, inclusive). The switches are in circuit with electromagnetic valves 230, 231 and 232.

The valve 230 is a main control valve and is connected with high and low pressure fluid supplies, which include the pumps previously referred to, by ducts 233 and 234. The discharge connections 235 and 236 for the valve 230 connect with the inlets of the valves 231 and 232. The valve 231 has outlets that connect with ducts 237 and 238 leading to the respective ends of the cylinder for the power unit 127, and the valve 232 is similarly connected ducts 239 and 240 with the opposite ends of the cylinder for the other power unit 128. The valves 231 and 232 also have exhaust ducts 241 and 242, respectively, for returning the pressure fluid to the source of supply. Each valve is operated by electromagnets 243 and 244 for the valve 230, 245 and 246 for the valve 231, and 247 and 248 for the valve 232.

Fixed to the upper end of each shaft 211 and 212 is an arm 249 that is connected by a spring 250 with a part of the frame for controlling movement of the switch actuating lever arms 224 and 225, as later to be described.

To facilitate removal of the cylinders and pistons from the discharge chamber 58 for cleansing purposes, each power unit is pivoted as indicated at 251 to the frame 205 (see FIG. 12). In order to limit retractive movement of the cylinders, the lateral extensions 163 and 164 of the plate 162 carry stops 252 and 253 that are pivoted on pins 254 projecting from depending lugs 255, as best shown in FIG. 6. When the stops 252 and 253 are in the position shown in FIG. 6, the arms 171 will engage the ends of the stops 252 and 253 to retain the cylinders 72 and 73 within the collars 90 and 91 of the discharge chamber 58, but when the stops 252 and 253 are moved out of position, the arms 171 can be moved far enough to the rear to permit complete withdrawal of the cylinders 72 and 73, whereupon the entire power units and piston rod assemblies, together with the cylinders and pistons, can be swung outwardly and laterally upon the pivotal connections 251, with the links 175 swinging on the pivots 173 (see FIG. 12). When the cylinders 72 and 73 clear the collars 90 and 91, the pistons 74 and 75 may be pushed through the forward ends of the cylinders, so as to make the interior of the cylinders and surface of the pistons easily accessible for cleaning purposes.

Assuming that a machine, constructed and assembled as described, has been connected with the electric and water service lines of a plant, the motor 51 is placed in operation to rotate the shaft 59 and operate the mixing and feeding elements. The low pressure pump operates to pump twice as much fluid as the high pressure pump, and the differential pressures are set by suitable regulating valve (not shown) but which are connected into the supply ducts 233 and 234 to maintain the pounds pressure desired. The low pressure fluid, being at a twice the flow volume and acting in the same power cylinders, will operate the pistons at substantially twice the speed as the high presure fluid. This is important, as it provides rapid charging of the cylinders 72 and 73 with sausage material and slow discharge under stuffing operations.

In order to load the machine with sausage material, the cover 34 is lifted to open the top of the compartment 28 and the sausage material is inserted through the open top into the compartment, to be mixed by the spiral blades and fed toward the opening 16. When the feeding pressure in the compartment 28 is sufficient, the valve 22 opens and the sausage material is discharged into the compartment 29 for further mixing and feed of the material through the throat 57 into the discharge compartment 58 in the form of a solid homogeneous mixture capable of completely filling the compartment 58 preparatory to ejection of the sausage material through one and the other of the ports 66 and 67 by the alternate operation of the cylinders 72—73 and pistons 74—75.

Figure 15:
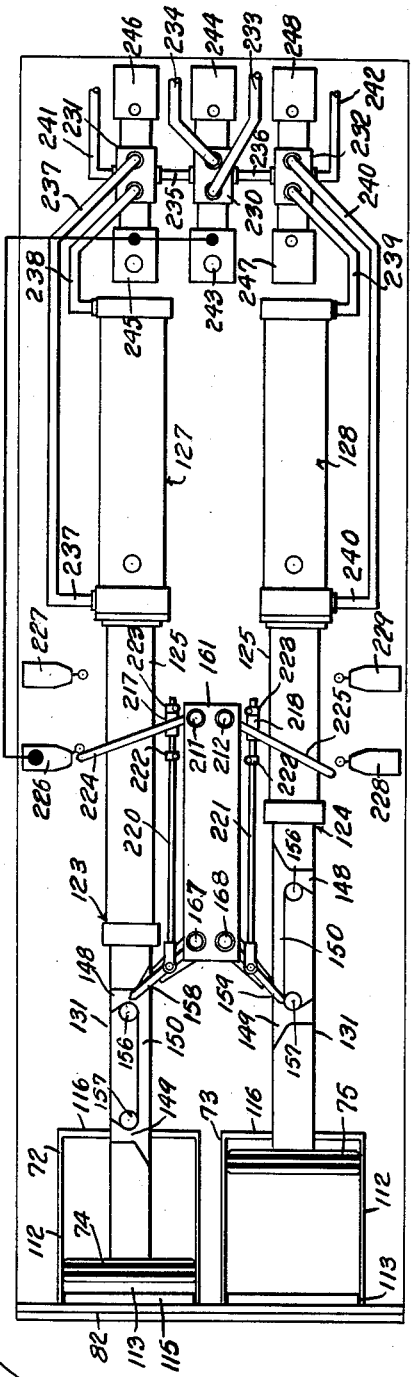
FIG. 15 is a diagrammatic view illustrating the position of the various actuating parts when one piston has finished ejection of sausage from its related cylinder and the other piston starts ejection.

In order to pick up a cycle of operation, it is assumed that both cylinders 72 and 73 are in the discharge compartment 58, with the forward edge portion 114 of both cylinders forming seals in surrounding relation with the ribs 115. The piston 74 has just ejected sausage material from the cylinder and the other piston 75 is in retracted position within the cylinder 73, with a full charge of sausage material contained between the front plate 82 and the front face of the piston 75 (see FIG. 15). Both cylinders and pistons are in momentary idle position, because the piston 74 has reached the end of its stroke, preparatory to reverse, and the piston 75 is at the conclusion of a dwell period.

In the position of the pistons, the arm 158 has just entered the transverse opening 148 of the piston rod assembly 123 and the arm 159 for the rod assembly has just passed out of the transverse opening 149 and is bearing on the roller 157 at the beginning of the way 150 of the piston rod assembly 124. The movement of the arm 158 into the opening 148 has resulted in tripping of the switch 226 through the link 220, stop collar 222, block 218, arms 213, shaft 211, and arm 224, all being responsive to pull of the spring 250 (FIG. 6). Closing of the switch results from a snap action imparted by the spring upon movement of the collar 222 away from the block 217, which results by a pull on the trip rod 220 at the time the arm 158 enters the opening 148. Closing of the switch establishes circuit with the electromagnets 243 and 245, so that the valves 230 and 231 are actuated to supply a low pressure fluid from the conduit 234 to the valve connecting duct 235 and valve 231 which directs the low pressure fluid through the duct 237 to the forward end of the cylinder of the power assembly 127. At the same time, exhaust is provided from the rear end of the cylinder through the duct 238 and exhaust duct 241. The piston 126 of the power unit 127 now starts retractive movement of the piston rod assembly 123 at a relatively faster speed than when the piston 74 moves on its stuffing cycle.

With start of the rod assembly, the piston 74 has a momentary lag because of the pin and slot connection 192 and 190 of the rod 181 with the sleeve 182 (FIG. 9). During this lag of the piston, the arm 158 which is engaged in the transverse opening 148 is urged rearwardly by the roller 156 of the piston rod assembly, causing the arm to swing with rearward movement for rocking the shaft 167 and causing the upper and lower arms of the linkage 169 to move retractively and pull upon the links 175 and 176 thereof to draw the cylinder retractively in the collar 90, with the bearing sleeve 120 of the cylinder riding upon the fixed section of the piston rod assembly. During the initial retractive movement of the cylinder 72, the forward cutting edge thereof is moved out of sealing relation with respect to the rib 115 for that cylinder. As soon as the seal is broken, the sleeve 182 has engaged the transverse pin 192 to couple the piston 74 with the piston rod assembly, whereupon the cylinder 72 and piston 75 move as a unit with the piston rod assembly until the arm 171 has engaged the stop 252 (FIGS. 2 and 6). During swinging of the arm 158, the rod 220 shifts rearwardly, and since the stop 222 is now bearing against the block 217, the shaft 211 is rocked to swing the switch operating arm 224 rearwardly. When the arm 158 lifts over the roller 157, it has completely reversed its position, and swinging movement of the arm is stopped through retention thereof in the way 150. At this time the open end of the cylinder has been retracted and has reached the end of its movement. During retractive movement of the cylinder 72 with the piston 74, the feed of the sausage material through the throat 57 fills in the space in the compartment previously occupied by the cylinder 72. When the cylinder 72 has come to rest, the arm 224 has carried past the arm of the switch 227. The piston rod assembly 123, however, continues its movement, with the arm 158 riding within the way 150, and the piston rod assembly draws the piston 74 retractively within the cylinder 72. During this movement of the piston 74, the cylinder 72 is restrained by contact of the arm 171 with the stop 252 and the piston creates a suction in the cylinder 72 that assures complete filling of the compartment 58 with sausage material. For an example of time in a cycle of retractive movement of the cylinder 72 and piston 74 may be approximately five seconds.

Figure 16:
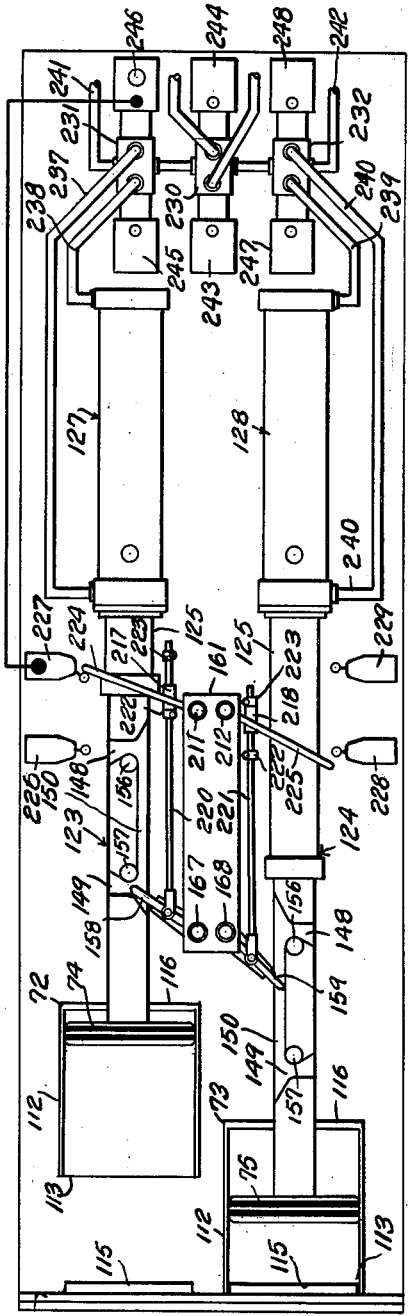
FIG. 16 is a similar view showing one piston and its cylinder completely retracted during which time the other piston is ejecting the sausage.

At the end of the piston stroke, the arm 158 enters the opening 149, pulling on the rod 220 to bring the collar 223 into contact with the block 217 to cause the arm 224 to actuate the switch 227 (see FIG. 16). The movement of the piston rod assembly 123 now reverses again under the low pressure fluid. The arm 158 is now in the opening 149 and the roller 147 pushes on the arm 158 to start forward swinging movement of the arm along with forward movement of the piston 74, since the piston 74 is in abutment with the shoulder 113 of the cylinder. The piston and cylinder thus move together as a unit, with the cutting edge 114 of the cylinder cutting through the sausage material that has filled the compartment 58, much as a biscuit or cookie cutter cuts through a sheet of dough, and which results in filling of the cylinder with sausage material by the time the open end of the cylinder reaches its sealing position with respect to the rib 115. During this movement, the piston remains in the rear portion of the cylinder until the seal has been effected. There is now a momentary dwell of the piston resulting from the pin and slot connection and during which time the backing plate 183 is coming into contact with the piston. This movement of the piston 74 requires about five seconds, so that the total charging time is approximately ten seconds. Upon contact, the piston is again ready to move in a forward direction to eject the charge of sausage material, but there occurs a dwell of approximately ten seconds while the other piston 75 is completing ejection of the charge of sausage material.

During the cycle above described, the piston 75 is moving in different phase relation at the end of a similar cycle, as now to be described. The piston 75 has been ejecting sausage material for approximately ten seconds and has reached a position near midway of the total ejection stroke and under the high pressure fluid. The high ppressure fluid was being admitted through the valve 232 to the rear end of the cylinder of the power unit 128 to act on the piston of that unit, while pressure fluid is being displaced through the ducts 240 and 242. The piston 75 continues its forward movement in the cylinder 73 for an additional ten seconds to complete ejection of the sausage material through the port 67. At the start of the ejection stroke, the sausage material under ejection acts upon the valve 102 against action of the spring 108, to shift the valve across the manifold connection 99 to discharge the material through the manifold to the stuffing nozzles which have been made effective, for example, upon opening of the valve 70 wherefrom the sausage material is discharged under pressure through the nozzle and into the casing "a" shown in FIG. 1. Since the ejection by the piston was in progress under influence of the high pressure fluid, the valves 102 and 101 are held in the position which closes discharge through the port 66, for the reason that the low pressure now operating on the piston 74 is not sufficient to cause ejection of the sausage material from the port 66, consequently, this is the factor that has resulted in the dwell of the piston 74. During ejection of the sausage material from the cylinder 73, the arm 159 rides idly in the pass 150 of the piston rod assembly 124 until it has been passed by the roller 156, whereupon the arm 159 drops into the opening 148 of the rod assembly 124, which movement causes the rod 221 and arm 225 (FIG. 17) to effect closure of the switch 228, whereupon the electromagnets 244 and 247 are energized to actuate the valves 230 and 232, so that low pressure fluid is discharged to the front end of the power unit 128 and the rear end is in connection with the exhaust duct 242. By this time the piston has reached the end of its ejection stroke. The piston 75 and cylinder 73 now start a cycle as described above in connection with the piston 74 and cylinder 72. The latter operation of the switch results in admission of high pressure fluid to the valve 231 and through the duct 238 to admit the high pressure operating fluid into the rear of the cylinder for the power unit 127. Since the pressure is now being relieved in the cylinder 73, and the high pressure is acting on the piston 74, the piston 74 now begins its ejection stroke, because the valving elements 101 and 102 now are free to shift under the higher pressure acting upon the valving element 101.

It is, therefore, obvious that a continuous flow of sausage material is maintained through the manifold 63 under substantially constant uniform pressure.

It is also obvious that sausage material may be replenished in the compartment 28 as required to maintain a continuous supply to the ejecting mechanisms, without shutting down the machine during a required run.

Near the completion of a run, the compartments 28 and 29 may be allowed to clear themselves of sausage material. At the completion of the run, the piston and cylinder assemblies are readily withdrawn from the discharge compartment 58 to permit ready access thereto. This is effected by lifting the stops 252 and 253, whereupon the arms 172 of the assemblies 169 and 170 may be swung rearwardly far enough to permit the cylinders to be completely retracted from the collars 90 and 91, after which the power units, including the piston rod assemblies, may be swung outwardly on the pivotal connections 251, with the links 175 swinging on the pivots 173, as shown in FIG. 12. After the cylinders have cleared the sides of the discharge compartment 58, the pistons 74 and 75 may be easily retracted through the open ends 113 of the cylinders, thereby giving access to all surfaces of the pistons and interiors of the cylinders. Removal of the cylinder units also provides free access to the discharge compartment 58 for cleaning purposes. Therefore, all parts of the machine are made readily available so that all surfaces may be kept sanitary. After cleaning the machine, the pistons are moved into the cylinders and the units are swung back into position where the cylinders may be slid through the collars 90 and 91, after which the stops 252 and 253 are again moved into position ready for the next run.

What we claim and desire to secure by Letters Patent is:

1. An apparatus for stuffing sausage and similar casings with a plastic material, including a container having a top opening through which stuffing material is inserted into the container and through which the material is maintained under atmospheric pressure, a partition dividing the container into a mixing compartment at one end and a feeding compartment at the other end, said partition having an opening between said compartments, a valve controlling said opening, a discharge compartment connected with a lower portion of the feeding compartment and having a constantly open connection with said feeding compartment, means in the mixing compartment for mixing and discharging the material through said valved opening into the feeding compartment, means in the feeding compartment for advancing and working the material to and through said constantly open connection into the discharge compartment, a nozzle for gathering the sausage casing thereon, duct means connecting the nozzle with the discharge compartment, means in the discharge compartment for collecting and confining a portion of the material for discharge through said duct means, and means for applying an ejecting pressure within said collecting and confining means for discharging the material through said connection to the nozzle and into the casing, and means for holding pressure on the material in said duct means.

2. An apparatus for stuffing sausage and similar casings with a plastic material, including a container having a top opening through which stuffing material is inserted into the container and through which the material is maintained under atmospheric pressure, a partition dividing the container into a mixing compartment at one end and a feeding compartment at the other end, said partition having an opening between said compartments, a valve controlling said opening, a discharge compartment connected with a lower portion of the feeding compartment and having a constantly open connection with said feeding compartment, said discharge compartment having separate discharge ports, means in the mixing compartment for mixing and discharging the material through said valved opening into the feeding compartment, means in the feeding compartment for advancing and working the material to and through said connection into the discharge compartment, a nozzle for gathering the sausage casing thereon, duct means connecting the nozzle with the separate discharge ports of the discharge compartment, valve means in said duct means for holding pressure on the material, separate means in the discharge compartment for collecting and confining portions of the material for alternate discharge through the respective ports into said duct means, and means for applying an ejecting pressure alternately within the respective collecting and confining means for discharging the material under said pressure through said connection to the nozzle and into the casing.

3. An apparatus for stuffing sausage and similar casings with a plastic material, including a compartment for containing the material and having opposed walls for containing the plastic material therebetween, a cylinder open at one end, a piston in the cylinder, one of said walls of the compartment providing support for said cylinder and the opposed wall having a discharge port for said material, means for reciprocating the piston, means interconnecting the cylinder with the piston moving means to reciprocate the cylinder with the piston as a unit to a retractive position within the compartment and to a projected position in the compartment with the open end of the cylinder in sealing relation with the discharge port, and means for releasing said connecting means from the piston reciprocating means for continuing movement of the piston in the cylinder when the cylinder is in said retracted position for drawing material into the compartment for filling the cylinder when the cylinder cuts through the material during movement into said projected position with the open end of the cylinder in sealing relation with the discharge port and for continuing movement of the piston for ejecting the material from the cylinder when the cylinder is in said sealing relation with the discharge port.

4. An apparatus for stuffing sausage and similar casings with a plastic material, including a compartment for containing the material and having opposed walls for containing the plastic material therebetween, cylinders reciprocable in the compartment and open at one end, pistons reciprocable in the cylinders, a wall of said compartment providing support for said cylinders and the opposite wall having discharge ports for said material, means for reciprocating the pistons, means for interconnecting the cylinders with the reciprocating means to move the pistons and cylinders as a unit to retractive positions within the compartment and to projected positions in the compartment with the open ends of the cylinders in sealing relation with respect to the discharge ports, means for releasing the cylinders from the piston reciprocating means at the limits of movement of the cylinders, means for retracting the pistons in the cylinders when the cylinders are in said retracted position for drawing material into the compartment for filling the cylinders when the cylinders cut through the material into sealing relation with the discharge ports and for ejecting the material from the cylinders when the cylinders are in said sealing relation with the discharge ports, means for actuating the piston reciprocating means in alternating relation for effecting alternately filling and discharging the cylinders, a manifold connecting said discharge ports, casing filling nozzles connected with the manifold, and valve means in the manifold for closing flow through one discharge port when the material is being ejected through the other discharge port.

5. An apparatus for stuffing sausage and similar casings with a plastic material, including a compartment having opposed walls for containing the material therebetween, a cylinder open at one end, a piston in the cylinder, one of said walls of the compartment providing support for said cylinder and the opposite wall having a discharge port for said material, means for reciprocating the piston, means for interconnecting the cylinder with the piston reciprocating means for moving the piston and cylinder as a unit to a retractive position within the compartment and to a projected position in the compartment with the open end of the cylinder in abutment with the wall having the discharge port to provide a seal thereof surrounding the discharge port, and means for releasing the cylinder from said piston reciprocating means to continue retractive movement of the piston in the cylinder when the cylinder is in its retracted position for drawing material into the compartment for filling the cylinder when the cylinder cuts through the material during movement into said projected position of the cylinder with the open end of the cylinder in said sealing relation with the discharge port and for ejecting the material from the cylinder when the cylinder is in said sealing relation with the discharge port, said piston having a lost motion connection with the said moving means to provide for an initial retractive movement of the cylinder prior to movement of the piston.

6. An apparatus for stuffing sausage and similar casings with a plastic material, including a compartment having opposed walls for containing the material therebetween, a cylinder having a head at one end and open at the other end, a piston in the cylinder, one wall of said compartment providing a support in which the cylinder reciprocates and the opposite wall having a discharge port for said material, a piston rod connected with the piston and slidable through th head of the cylinder, a lever arm having oscillatable support relatively to said compartment, means connecting the lever arm with the head of the cylinder, said lever arm having a part to engage a part of the piston rod when the cylinder is in its projected position and the piston is near the open end of the cylinder for retracting the cylinder and piston as a unit, said lever arm being releasable from said part of the piston rod on continued retractive movement of the piston rod for drawing the piston retractively in the cylinder to suck the material into the space in the compartment previously occupied by the cylinder, said piston rod having another part for engagement by said part of the lever arm when the piston reaches its retracted position in the cylinder to project the cylinder and piston as a unit when the piston rod moves in the opposite direction to cause the open end of the cylinder to cut through the material in the compartment for filling the cylinder and to bring the cylinder into sealing relation with the discharge port, said lever arm being releasable from said last named part upon continued movement of the piston rod for moving the piston in the cylinder to eject the material from the cylinder through the discharge port, and an actuator connected with the piston rod to effect reciprocation thereof.

7. An apparatus for stuffing sausage and similar casings with a plastic material, including a compartment having opposed walls for containing the material therebetween, a cylinder having a head at one end and open at the other end, a piston in the cylinder, one wall of said compartment providing a support in which the cylinder reciprocates and the opposite wall having a discharge port for said material, a piston rod having a lost motion connection with the piston rod and slidable through the head of the cylinder, an actuator for reciprocating the piston rod and a lever arm having oscillatable support relatively to said compartment, means connecting the lever arm with the head of the cylinder, said piston rod having arm engaging parts spaced apart long the piston rod, an arm movable with the lever arm for engaging one of said parts on the piston rod when the cylinder is in a projected position within the compartment and the open end is forming a seal surrounding the discharge port and the piston is near the open end of the cylinder for retracting the cylinder from said projected position and to break said seal while said lost motion connection is taking effect on the piston, and means on the piston rod for releasing said arm on continued retractive movement of the piston rod for moving the piston retractively within the cylinder to exert a suction force on the material for filling the space in the compartment previously occupied by the cylinder, said arm being engageable with the other part on the piston rod when the piston reaches its retracted position in the cylinder to effect movement of the cylinder with the piston when the piston rod moves in the opposite direction to cause the open end of the cylinder to cut through the material in the compartment for filling the cylinder and to return the cylinder into said sealing relation with the discharge port, said piston rod having a second means for releasing the arm upon continued movement of the piston rod for moving the piston in the cylinder to eject the material from the cylinder through the discharge port.

8. An apparatus for stuffing sausage and similar casings with a plastic material as described in claim 6, wherein the actuator is actuated by pressure fluid and including means actuated by the piston rod for supplying a low pressure high velocity fluid to the actuator during filling of the cylinder preparatory to ejection, and means for supplying a high pressure low velocity fluid to the actuator for actuating the piston to eject the material from the cylinder through the discharge port.

9. An apparatus as described in claim 6, wherein the actuator is operated by pressure fluid and means for supplying the pressure fluid, including a high pressure fluid source, a low pressure fluid source, a valve connected with the high and low pressure fluid sources, a second valve connected with the first valve and with an exhaust duct, ducts connecting the second valve with the respective ends of the actuator, means actuated by the piston rod for adjusting both valves for supplying high pressure fluid to the forward ends of the actuators for effecting retractive movement of the piston and cylinder at high speed, a second means actuated by the piston rod for directing low pressure fluid to the rear end of the actuator when the piston reaches its retracted position within the retracted cylinder to reverse movement of the piston and cylinder when the cylinder cuts through the material and is brought into sealing relation with the discharge port, and means for actuating the first named valve for admitting high pressure fluid to the actuator for effecting movement of the piston at low speed for ejecting the material from the cylinder through the discharge port.

10. An apparatus for stuffing sausage and similar casings with a plastic material as described in claim 6, wherein said actuator is operated by pressure fluid, and control means for supplying pressure fluid to the actuator including a switch actuating means, a rod fixed to the lever arm which engages said parts of the piston rod, spaced collars on the rod to effect oscillatory movement of the switch actuating means, switches in position to be closed by the switch actuating means, a low pressure fluid source, a high pressure fluid source, a valve having inlets connected with the high and low pressure fluid sources, a second valve connected with the first valve, ducts connecting the second valve with the respective ends of the actuator, electromagnets for actuating said valves, an electric circuit connecting one switch for energizing electromagnets for both valves and supplying low pressure fluid to forward ends of the actuator for effecting retractive movement of the piston and cylinder at high speed, an electric circuit connecting the other switch with an electromagnet of said second valve for shifting of low pressure fluid to the rear end of the actuator when the piston reaches its retracted position within the retracted cylinder to reverse movement of the piston and cylinder for filling the cylinder, and means for actuating the first named valve for admitting high pressure fluid to the actuator for moving the piston at low speed when ejecting the material from the cylinder through the discharge port.

11. An apparatus as described in claim 6 wherein the actuator is actuated by pressure fluid and means for controlling supply of fluid to the actuator to effect reciprocation of the piston rod, including a rocker arm, a rod fixed to the rocker arm which engages said parts of the piston rod and having slidable support with the rocker arm, spaced collars on the rod to effect oscillatory movement of said rocker arm, a switch actuating arm movable with said rocker arm, switches in position to be closed by the switch arm at the respective ends of the travel of the piston rod, a low pressure fluid source, a high pressure fluid source, a valve connected with the high and low pressure fluid sources, a second valve connected with the first valve and with an exhaust duct, ducts connecting the second valve with the respective ends of the actuator, electromagnets for actuating said valves, means connecting the switch which is actuated by the switch arm when the piston and cylinder are in their projected positions for actuating the electromagnets of both valves and supplying low pressure fluid to the forward ends of the actuators for effecting retractive movement of the piston and cylinder at high speed, an electric means connecting the other switch with the electromagnet of said second valve for shifting of low pressure fluid to the rear end of the actuator when the piston reaches its retracted position within the retracted cylinder to reverse movement of the piston and cylinder when the cylinder cuts through the material and is brought into sealing relation with the discharge port, and means for actuating the first named valve for admitting high pressure fluid to the actuator for effecting movement of the piston for ejecting the material from the cylinder through the discharge port.

12. An apparatus for stuffing sausage and similar casings with a plastic material, including opposed side walls providing a compartment for containing the material, cylinders reciprocable in the compartment and open at one end, pistons reciprocable in the cylinders, one wall of said compartment providing support for said cylinders and the opposite wall having discharge ports for said material, a discharge manifold interconnecting the discharge ports, means for reciprocating the pistons, means for connecting the cylinders with the piston reciprocating means to reciprocate the cylinders with the pistons as a unit to retractive positions within the compartment and to a projected position in the compartment wtih the open end of the cylinders in sealing relation with respect to the discharge ports, means for releasing said connecting means from the piston reciprocating means for retracting the pistons in the cylinders when the cylinders are in retracted position for drawing material into the compartment between the cylinders and the wall having the discharge ports for filling the cylinders as the cylinders cut through the material when moved into sealing relation with the discharge ports on the said projection stroke, means for releasing said connecting means from the piston reciprocating means for ejecting the material from the cylinders, means for effecting alternate actuation of said piston and cylinder reciprocating means for maintaining a substantially constant flow of material through the manifold, and valve means in the manifold for closing flow through one discharge port when the material is being ejected through the other discharge port.

13. An apparatus for stuffing sausage and similar casings with a plastic material, including opposed side walls providing a compartment for containing the material, cylinders having a head at one end and open at the other end, pistons in the cylinders, one of said side walls of said compartment providing for reciprocating support of the cylinders and the opposite wall having discharge ports for said material, piston rods connected with the pistons and slidable through the heads of the cylinders, lever arms having pivotal support relatively to said compartment, linkages connected with the lever arms and to the heads of the cylinders, arms connected with the lever arms and movable therewith, said piston rods having spaced apart means thereon for engaging said arms, one of said spaced apart means being in position to engage said when the cylinders are in projected position and the pistons are near the open ends of the cylinders for actuating said linkages to retract the cylinders from said projected position with retractive movement of the piston rods, means on the piston rods for releasing the arms on continued retractive movement of the piston rods for drawing the pistons retractively within the cylinders to exert suction force on the material for filling the space in the compartment previously occupied by the cylinders, said arms being engageable with the other of the spaced apart means when the pistons reach retracted position in the cylinders to effect movement of the cylinders to said projected position when the piston rods move in the opposite direction to cause the open ends of the cylinders to cut through the material in the compartment for filling the cylinders and to bring the cylinders into sealing relation with the discharge port, means on the rods for releasing said arms from the piston rods upon continued movement of the piston rods for moving the pistons in the cylinders to eject the material from the cylinders through the discharge ports, actuators connected with the piston rods to effect reciprocation thereof, and means for alternately operating the actuators for effecting alternating movements of the respective pistons and cylinders to effect alternating discharge through said ports.

14. An apparatus for stuffing sausage and similar casings with a plastic material, including a frame, a compartment carried by the frame for containing the material, a cylinder having a head at one end and open at the other end, a piston in the cylinder, said compartment having a wall provided with an opening for slidably containing the cylinder therein, a piston rod connected with the piston and slidable through the head of the cylinder, an actuator for reciprocating the piston rod, means connecting the cylinder with the piston rod to reciprocate the cylinder, and means pivotally connecting the actuator with a part of said frame for hingedly carrying the actuator, piston, piston rod and cylinder as a unit for movement laterally away from said wall of the compartment to permit retraction of the cylinder from said opening for cleaning purposes.

15. An apparatus for stuffing sausage and similar casings with a plastic material, including a frame, a compartment carried by the frame for containing the material, a cylinder having a head at one end and open at the other end, a piston in the cylinder, said compartment having a wall provided with an opening for slidably containing the cylinder therein, a piston rod connected with the piston and slidable through the head of the cylinder, a lever arm having pivotal support on a part of the frame and being oscillated by the piston rod, a linkage mechanism connecting the lever arm with the head of the cylinder for reciprocating the cylinder within the compartment, an actuator for reciprocating the piston rod, means pivotally connecting the actuator with a part of said frame, and a movable stop on the frame and engageable with said arm for limiting retractive movement of the lever arm and said stop being movable away from said arm to effect a further retraction of the cylinder from said compartment, said power cylinder, piston rod and cylinder being adapted to be swung laterally away from said wall of the compartment to permit projection of the piston through the open end of the cylinder for cleaning purposes.

16. An apparatus for stuffing sausage and similar casings with a plastic material, including a frame, a compartment carried by the frame for containing the material, a cylinder having a head at one end and open at the other end, a piston in the cylinder, said compartment having a wall provided with an opening for slidably containing the cylinder therein, a piston rod connected with the piston and slidable through the head of the cylinder, a lever arm having pivotal support on a part of the frame and being oscillated by the piston rod, a linkage mechanism connecting the lever arm with the head of the cylinder for reciprocating the cylinder in the opening in the wall of the compartment, a power cylinder having a forward end passing the piston rod, a power piston in the power cylinder and connected with the piston rod, means pivotally connecting the opposite end of the power cylinder with a part of said frame, and a movable stop on the frame and engageable with said arm for limiting retractive movement of the piston during stuffing operations and said stop being movable away from said arm to effect complete retraction of the first named cylinder from said compartment, said power cylinder, piston rod, and the first named cylinder being adapted to be swung laterally away from said wall of the compartment to facilitate cleaning of said mechanisms.

17. An apparatus for stuffing sausage and similar casings with a plastic material, including a frame, walls providing a compartment for containing the material, a cylinder having a head at one end and open at the other end, a piston in the cylinder, one of the walls of said compartment having an opening in which the cylinder is mounted to reciprocate therein, a reciprocatory piston rod assembly connected with the piston and extending through the head of the cylinder, an actuator connected with the opposite end of the piston rod assembly, said piston rod assembly including end members spaced from ends of said intermediate members to provide transverse passageways therebetween, longitudinal members of arcuate cross section cooperating with the spaced apart members to provide a generally circular cross section for the piston rod, the intermediate member being of less width than the diameter of the piston rod to provide a longitudinal way between said longitudinal members and interconnecting said transverse passageways, a linkage connected with the head of the cylinder, and a lever arm connected with the linkage and having fixed pivotal support on a part of the frame and adapted to engage in one and the other of the transverse passageways to actuate the cylinder with the piston rod during parts of the stroke of the piston rod and to ride in said way to leave the cylinder in stationary positions during movement of the piston within the cylinder.

18. An apparatus for stuffing sausage and similar casings with a plastic material, including a compartment for containing the material, said compartment having opposite walls with one of said walls being provided with an opening and the opposite wall having a discharge port, a rib projecting inwardly of the compartment from the wall having the discharge port, said rib being in coaxial relation with said opening, a cylinder in said opening and having a head at one end and open at the other end, means for reciprocating said cylinder from a first position in the compartment for cutting through the material in the compartment and bringing the open end into sealing relation with said rib and for returning the cylinder to said first position, a piston in the cylinder, a piston rod connected with the piston and reciprocable through the head of the cylinder, means for actuating the piston rod to reciprocate the piston in the cylinder to eject the material through said discharge port when the open end of the cylinder is in said sealing relation with said rib and to suck material into the compartment when the cylinder is in retracted position, and means connecting the reciprocating means for the cylinder with the piston rod to move the piston and cylinder as a unit, said connecting means being releasable from the rod when the cylinder is in said retracted and projected positions for independent reciprocation of the piston by the piston rod.

19. An apparatus for stuffing sausage and similar casings with a plastic material, including a compartment for containing the material, said compartment having opposite walls with one of said walls being provided with laterally spaced apart openings and the opposite wall having discharge ports, cylinders having a head at one end and open at the other end, means on the wall having the discharge openings for cooperating with the open ends of the cylinders to provide seals, means for reciprocating said cylinders within said openings to cut through the material and bring the open ends into said seals and to retract the cylinders from said seals, a piston in each cylinder, piston rods connected with the respective pistons and reciprocable through the heads of the cylinders, means for alternately reciprocating the piston rods, and means automatically connecting the cylinder reciprocating means with said piston rods to reciprocate the pistons and cylinders as units, said cylinder reciprocating means being releasable from driven relation with said piston rods when the cylinders are in their said respective positions whereby continued movement of the piston rods causes one piston to eject the material from its related cylinder through said discharge port when the open end of said cylinder is in said sealing relation and to cause the other piston to suck the material into the compartment.

20. An apparatus for stuffing sausage and similar casings as described in claim 19, wherein the pistons have lost motion connections with said piston rods effecting initial movement of the cylinders for breaking said seals prior to movement of said pistons.

21. An apparatus for stuffing a plastic material such as sausage into a casing, including means providing a discharge compartment having an outlet, means for feeding the plastic material under atmospheric pressure into the discharge compartment, a discharge nozzle on which the casing is gathered, a discharge duct connecting the discharge nozzle with the outlet of the discharge compartment, back pressure valve means in the discharge duct for holding pressure on the plastic material in said discharge duct, an annular seat within the discharge compartment and surrounding the outlet, a cylindrical cutter movably supported within the discharge compartment and having an open end for cutting through the plastic material and for engaging said seat to close said open end, a piston closely fitting within the cylindrical cutter and axially movable therein, reciprocatory actuating means connected with the piston and with the cutter, means for effecting actuation of the reciprocatory actuating means in one direction for moving the cylindrical cutter over the piston to fill said cylindrical cutter with plastic material and to engage said seat and for subsequent axial movement of the piston within the cylindrical cutter for discharging the plastic material from the cylindrical cutter through said outlet, and means for reversing the reciprocatory actuating means for retracting the cylindrical cutter and piston as a unit to allow refilling of the discharge compartment with plastic material.

22. An apparatus for stuffing a plastic material such as sausage into casings, including means providing a discharge compartment having spaced apart outlets, means for feeding the plastic material under atmospheric pressure into the discharge compartment, a discharge nozzle on which the sausage casing is gathered, discharge ducts connecting the discharge nozzle with said outlets, back pressure valve means in the discharge ducts for holding pressure on the plastic material, annular seats within the discharge compartment and circling the outlets, cylindrical cutters in the discharge compartment and each having an open end for cutting through the plastic material and engageable with a seat to seal plastic material within the cylindrical cutters, a piston closely fitting within each cylindrical cutter and movable therein, actuating means connected with each piston and cylindrical cutter assembly, means for effecting operation of the actuating means in one direction for moving the cylindrical cutters over the pistons to fill the cylindrical cutters with plastic material and to engage said seats for sealing the plastic material within the cylindrical cutters for subsequent movement of the pistons within the cylindrical cutters for discharging the plastic material from the cylindrical cutters through said outlets, means for reversing the direction of operation of the actuating means for simultaneously retracting the cutters and pistons to allow refilling of the discharge compartment with plastic material, and means for alternating the operation of the actuating means whereby one of said piston and cylindrical cutter is discharging plastic material when the other piston and cylindrical cutter is filling with the plastic material.

23. An apparatus for stuffing a plastic material such as sausage into a casing as described in claim 22, wherein said discharge ducts include a manifold providing valve housings in connection with the outlets from the discharge compartments and located on opposite sides of a passageway to said discharge nozzle, and the back pressure valve means include valving elements having piston type heads slidable in said housings and blocking passage of material through the manifold from one discharge outlet to the other, said valve elements having stops to support the valve heads normally disposed on the respective sides of the passageway to said nozzle, and springs for yieldably retaining the valve heads in said stopped position, said valve heads being movable under pressure of the material from the cylindrical cutter and piston which is discharging the sausage material to open the passageway to the nozzle and for contact with the other valve head to retain said valve head in closed position when the other cylindrical cutter and piston is filling with sausage material.

24. An apparatus for stuffing a plastic material such as sausage into a casing, including means providing a discharge compartment having opposite end walls with one of said end walls being provided with an opening and the other end wall with an outlet, means for feeding the plastic material under atmospheric pressure into the discharge compartment, a discharge nozzle on which the casing is gathered, a discharge duct connecting the discharge nozzle with the outlet of the discharge compartment, back pressure valve means in the discharge duct for holding pressure on the plastic material in said discharge duct, an annular rib projecting inwardly of the compartment from the wall having the outlet, said rib being in coaxial relation with the opening in the other wall, a cylindrical cutter movably supported within said opening and having a head at the outer end and an open inner end, a piston fitting within the open end of the cutter when the cutter is in a retracted position, actuating means connected with the piston and with the head of the cutter, means for effecting operation of the actuating means in one direction for moving the cutter over the piston and inwardly of the compartment to fill the cutter with plastic material and to seal with said rib, said actuating means also providing for subsequent movement of the piston in the same direction within the cutter for discharging the plastic material from the cutter through said outlet, and means for reversing the reciprocatory actuating means for retracting the cutter and piston as a unit to their first named positions and to allow refilling of the discharge compartment with plastic material.

References Cited in the file of this patent

UNITED STATES PATENTS 2,805,444     Hensgen et al. _____ Sept. 10, 1957

FOREIGN PATENTS 65,266     Austria _____ June 10, 1914
720,478     France _____ Dec. 3, 1931